Patented Dec. 18, 1951

2,579,123

UNITED STATES PATENT OFFICE 2,579,123

REACTIVATION OF SILICA-ALUMINA CATALYSTS BY SILICA ADDITION

William A. Pardee, Fox Chapel, Pa., assignor to Gulf Research & Development Company, Pittsburgh, Pa., a corporation of Delaware No Drawing. Application September 22, 1948, Serial No. 50,660

18 Claims. (Cl. 252—412)

This invention relates to the reactivation of catalysts and more particularly to the reactivation of silica-alumina catalysts such as those used in petroleum cracking.

In the usual commercial catalytic cracking processes a heavy hydrocarbon oil such as a gas oil wholly or partly in vapor phase is contacted with a cracking catalyst at an elevated temperature which may operatively range from 700° to 1100° F., but which in commercial practice does not normally go below 800° F. or above 1000° F. The oil is cracked to gas, gasoline hydrocarbons and heavier liquid hydrocarbons, and a hydrocarbonaceous material generally called "coke" is deposited on the catalyst. This coke deposit temporarily deactivates the catalyst and makes necessary its regeneration. The regeneration is usually carried out by contacting the coked catalyst with air so as to burn off the coke. In this regeneration step the temperature usually goes as high as 1000° F. and may reach 1100° F. or somewhat above. The activity of the catalyst following any one regeneration is substantially the same as the activity of the catalyst prior to the preceding cracking step. Thus the de-activation of the catalyst in a single cracking cycle is a temporary condition which is readily corrected by means of regeneration.

It has been found, however, that when a silica-alumina cracking catalyst is subjected to cycles of cracking and regeneration steps over a long period of time a different and permanent deactivation of the catalyst takes place. These cycles of cracking and regenerating are continued for an extended period of time with the permanent deactivation of the catalyst becoming progressively more serious. For example, in the Houdry fixed-bed type of operation the permanent deactivation continues until at the end of about 18 months it is no longer feasible to continue operation. It is the practice when operating such a process to shut the unit down and replace the permanently deactivated catalyst with fresh catalyst. This operation usually necessitates a shut-down time of several weeks in the Houdry-type process. This is an expensive operation not only because of the cost of labor and of fresh catalyst but also because of production loss. The continuing permanent deactivation of the catalyst also has another undesirable effect. Since the permanent deactivation of a catalyst begins long before this deactivation has progressed to a point making it necessary to replace the catalyst, it is the practice to gradually increase the severity of conditions such as temperature and pressure in order to compensate for the loss in activity of the catalyst. Such an increase in severity of conditions is usually undesirable, as the product distribution is inevitably affected.

It is an object of the present invention to reactivate a silica-alumina catalyst.

It is a further object of this invention to reactivate a silica-alumina cracking catalyst in situ.

These and other objects of the present invention are achieved by the process herein described comprising reactivating a permanently deactivated silica-alumina catalyst by impregnating silica on the interior and exterior surfaces of the catalyst. I have found that by impregnating a permanently deactivated silica-alumina catalyst with a compound yielding silicon oxide on decomposition and then accomplishing decomposition such as by heating or with the use of a hydrolyzing agent, the activity of the catalyst can be substantially increased, in many cases to equal or exceed the activity of the catalyst prior to permanent deactivation. The decomposable silicate can be applied in the form of a vapor, liquid or solution. An organic or inorganic compound exemplified by such compounds as alkyl silicates, silicones, silicon tetrachloride, or alkali metal silicates may be used.

The process of the invention is applicable to the reactivation of a wide variety of silica-alumina catalysts, particularly silica-alumina cracking catalysts which may or may not contain other metal oxides such as zirconia, magnesia, thoria, and the like. Important silica-alumina cracking catalysts include the so-called natural catalysts which are prepared by conventional acid treatment of acid-activatable montmorillonite clays, which clays are usually referred to as sub-bentonites to distinguish them from the Wyoming or swelling-type bentonites. Before use and after pelleting, if pelleted catalysts are desired, the acid-treated clay material is usually calcined in air at a temperature of 800° to 1100° F., ordinarily about 1000° F. I have found that natural catalysts of this type may effectively be reactivated by the present process.

It has been proposed to manufacture synthetic silica-alumina catalysts by a variety of methods. Although the invention includes the reactivation of the general class of synthetic silica-alumina catalysts, I have discovered that the process is especially advantageous when applied to the treatment of silica-alumina catalysts manufactured by forming a silica-alumina hydrogel; i. e., combining precipitated hydrated silica gel and precipitated hydrated alumina gel without drying the gels. These catalysts may be manufactured by processes including precipitating one hydrogel in the presence of the other as by co-precipitating the gels, separately precipitating the hydrogels and combining the undried hydrogels, or by first precipitating the silica hydrogel and then forming the silica-alumina hydrogel by precipitating a gel or gelatinous precipitate of alumina in the presence of the silica hydrogel. The combined gels are then dried, pelleted, if pellets are desired, and then usually calcined in the manner described above in connection with the natural catalyst. These catalysts are usually made from raw materials containing alkali metals, and it is the normal practice to remove such metals from the gels either before or after drying by treatment with an acid or a material that has base exchange properties such as ammonium hydroxide or ammonium chloride.

Synthetic silica-alumina cracking catalysts of the class described above are composite materials which are referred to as calcined composites of undried hydrous silica and alumina gels. The materials are amorphous and reasonable variation in the proportions of silica and alumina does not materially affect their properties, indicating that they are not true chemical compounds, yet there appears to be some sort of union resulting from combining the hydrous gels which is not readily possible when silica and alumina are combined by other methods. The more important catalysts contain a greater proportion of silica than alumina; preferably they contain about 80 to 95 per cent by weight silica and especially about 85 to 90 per cent.

Catalysts having somewhat similar characteristics can be prepared by precipitating a silica hydrogel, drying this gel, and then combining the resulting dry silica gel with alumina in a form which is generally referred to and is referred to herein as the hydrogel but which may be a gelatinous precipitate of aluminum hydroxide. This may be done by mixing the silica gel with a solution of a soluble aluminum salt such as aluminum nitrate and then precipitating the alumina hydrogel by treating the resulting mixture with an alkaline material, preferably ammonium hydroxide.

The treatment applied to the permanently deactivated catalyst, particularly in fixed-bed operations, may be varied depending upon the type of compound used to deposit the silica on the catalyst surface. Desirable results have been obtained by pouring a liquid containing the compound yielding the silicon oxide over the catalyst. The preferable method for treating catalysts disposed in a fixed-bed, however, is vacuum impregnation of the catalyst with the silicon compound in the form of liquid or vapor.

While vacuum impregnation of the deactivated catalyst is the preferred method for fixed-bed catalysts, other methods such as impregnation at atmospheric or superatmospheric pressure and treatment with vapors of the silicon impregnating material, followed by the proper transformation or decomposing steps, give satisfactory results. The decomposition of the silicon treating material can be performed by several methods. One such method comprises drying at a temperature below the boiling point of the silicon impregnating material (atmospheric drying) followed by raising the temperature to that in the range to be used in the hydrocarbon conversion and regeneration processes. The drying process can be performed at atmospheric, subatmospheric, or superatmospheric pressure.

It is an unexpected discovery of the present invention that a catalyst such as a synthetic silica-alumina catalyst is also a catalyst for the decomposition of the silica-containing compound such as ethyl silicate. This allows for its decomposition at a low temperature in the presence of the catalyst. Also, silica is not deposited on the walls of the vessel but on the catalyst surfaces by a low-temperature catalytic decomposition.

I have found in accordance with the invention that the effect of treating a permanently deactivated silica-alumina catalyst with a compound yielding silicon oxide on decomposition varies depending upon the type of compound employed. Thus, the present invention offers a means of obtaining different types of reactivation. I have found when maximum gasoline production is desired it is preferable to accomplish the reactivation by treating the permanently deactivated catalyst with an alkyl silicate such as ethyl silicate. Reactivation using this compound produces a reactivated catalyst which possesses increased over-all activity. The gasoline yield is increased, and this is accompanied in the normal case by an increase in the yield of gas and coke. On the other hand, it is desirable in certain cases to reduce the production of coke and gas to the minimum while at the same time obtaining a reasonable yield of gasoline. I have found, for example, that by reactivating a permanently deactivated cracking catalyst with a silicone, a catalyst is obtained which produces when employed in the cracking operation a somewhat lower yield of gasoline than when reactivation with an alkyl silicate is practiced, but the production of gas and coke is at an exceptionally low level. Accordingly, the use of the catalyst results in an operation involving an unusually high ratio between gasoline and coke plus gas. In other words, the operation involves very little conversion of the charge material to relatively useless products.

The invention also involves the surprising discovery that the activity of the reactivated catalysts can be adjusted in the direction of a more valuable product distribution by heating the reactivated catalysts at a temperature of 1200° to 1500° F., preferably for several hours; especially valuable results having been obtained by heating at temperatures of this order from 10 to 40 or more hours. The practice of this heating step is particularly advantageous in the case of reactivation by an alkyl silicate. As pointed out above, a catalyst reactivated by the use of an alkyl silicate converts the charge not only into a high yield of gasoline but also into a high yield of gas and coke. While the gasoline/gas plus coke ratio obtained may be better than and is usually no worse than the ratio obtained when using a fresh catalyst, it would obviously be advantageous to increase this ratio. Heating a catalyst reactivated in this way at 1200° to 1500° F. has been found not only to increase the gasoline/gas plus coke ratio but also in many cases to increase the actual gasoline yield.

The following examples will serve to illustrate the practice of the invention. The gas plus coke yields given in certain of the examples were determined by the difference between the oil charged and the total liquid recovery, as I have found this to be a simple and accurate way to compare the gas and coke producing properties of catalysts. The deviation from the actual yields is small, of the order of one or two per cent greater, and the deviation is substantially constant from one run to another.

EXAMPLE I 615 parts by weight of permanently deactivated silica-alumina catalyst containing about 12 per cent by weight alumina was treated as described below. The catalyst had been deactivated by being used in a commercial fixed-bed unit for about 18 months. This catalyst was a commercial material prepared by coprecipitating hydrous silica and alumina gels containing sodium, drying the combined gels, base exchanging the dried gels with ammonium hydroxide, pelleting and calcining. This catalyst was calcined in preparation for reactivation by heating the body of catalyst throughout for six hours until a temperature of 1025° F. was eventually reached and this temperature was maintained for about ten additional hours. A stream of air was then forced slowly through the catalyst. When the catalyst had cooled to room temperature, it was subjected to a vacuum of 8 mm. Hg for about thirty minutes. There was then added a quantity of a solution of tetraethyl orthosilicate (of a grade containing 28–29 per cent $SiO_2$) sufficient to cover the catalyst, and this was allowed to stand for about five minutes under the vacuum conditions, and then the pressure was raised to atmospheric and the material allowed to stand for another twenty-five minutes. The excess tetraethyl orthosilicate was allowed to run off. The catalyst was weighed and found to have increased to 964 parts indicating that 349 parts by weight of tetraethyl orthosilicate solution had been adsorbed. Upon calculation from the concentration of the solution it was found that the 615 parts of permanently deactivated catalyst had adsorbed 100 parts calculated as $SiO_2$.

The treated catalyst was then dried for 24 hours at about 255° F., followed by a calcining treatment comprising raising the temperature to about 1040° F. in about six hours and maintaining this temperature for an additional fourteen hours. The catalyst was again weighed and found to contain 714.3 parts by weight, showing that it now contained 99.3 parts or 13.9 per cent of silica deposit.

Following the deposition of silica, the reactivated catalytic material was tested by passing one volume of a 37.4° A. P. I. gravity Pennsylvania gas oil, boiling over the range from 458° to 676° F., in one hour through a tube containing one volume of catalyst at 841° F. The gasoline yield in weight per cent of charge was found to be 30.1 per cent, and the gas plus coke yield 12.8 per cent. When the untreated permanently deactivated catalyst was tested for cracking activity, in the manner described above, a gasoline yield of 21.4 per cent and a gas plus coke yield of 9.7 per cent were obtained. Thus there was a substantial reactivation by the herein described treating process.

EXAMPLE II

Following a procedure similar to that described in Example I but using an ethyl silicate containing a higher percentage of silicon (for example, a grade marketed as "Ethyl-Silicate-40" containing about 40 per cent $SiO_2$) a deposition of about 23 per cent $SiO_2$ was effected in a single treatment. When this catalyst was tested under conditions similar to those described in Example I, yields of 33.9 per cent gasoline and 16.3 per cent gas plus coke were obtained.

Multiple impregnations, with intermediate transformation steps, were used to give higher deposits of silica. Any desired deposit may be obtained by a dilution of the silicate solution with a suitable diluent such as methyl alcohol or by multiple impregnations of the catalytic material.

Multiple impregnations, while useful for high deposition of silica, are not as desirable as single impregnations from one standpoint and it is preferable to use a solution sufficiently concentrated in silicon to effect in a single impregnation the desired silica deposit. For example, a catalyst containing 23.1 per cent of deposited silica from a single impregnation, using "Ethyl-Silicate-40," when tested as above described produced 33.9 per cent gasoline, while another catalyst containing a similar deposit of silica resulting from a double impregnation with tetraethyl-o-silicate produced only about 31 per cent gasoline. On multiple impregnations using the tetraethyl-o-silicate solution an optimum silica deposition appears to be about 20 per cent while the optimum when using the "Ethyl-Silicate-40" in a single impregnation is appreciably higher, about 25 per cent silica. A single impregnation with tetraethyl-o-silicate produces the same result as a single impregnation with "Ethyl-Silicate 0" when the same amount of silica is deposited.

The following table shows conversion results for a fresh and a permanently deactivated catalyst of the type used in Example I, and for reactivated catalysts containing various percentages of silica deposit on the catalyst.

*Reactivation of Silica-Alumina Catalyst*

| Run | Silica Deposit [1] (Wt. Per Cent) | Yields, Gasoline | Wt. Per Cent Gas + Coke | |
|---|---|---|---|---|
| 1 | 0 | 30.1 | 13.1 | Fresh Silica-Alumina Catalyst. |
| 2 | 0 | 21.4 | 9.7 | Permanently Deactivated. Silica-Alumina Catalyst. |
| 3 | 7.6 | 26.6 | 11.2 | Reactivated Catalyst. |
| 4 | 13.9 | 30.1 | 12.8 | Do. |
| 5 | 17.3 | 31.7 | 15.2 | Do. |
| 6 | 23.1 | 33.9 | 16.3 | Do. |
| 7 | 28.4 | 32.1 | 16.5 | Do. |

[1] Weight per cent reactivated catalyst.

EXAMPLE III

This example illustrates the reactivation of the permanently deactivated catalyst described in Example I, but using sodium silicate as the reactivating agent and including a step for removing the alkali metal. In this particular example the sodium silicate employed was a commercial grade marketed as "N" brand sodium silicate. This commercial grade of sodium silicate contains about 29 per cent $SiO_2$. When a basic solution of "N" brand sodium silicate (for example, an aqueous solution containing 15 per cent by weight of "N" brand sodium silicate) was employed as the impregnating agent, a silica deposit of about 3.2 per cent on the catalyst was obtained. When the reactivated catalyst thus obtained was tested under conditions similar to those described in Example I, yields of 26.0 per cent gasoline and 11.5 per cent gas plus coke were obtained. Similar results were obtained when the permanently deactivated catalyst of Example I was reactivated with an acid solution of "N" brand sodium silicate. For example, when 4.3 per cent of silica was deposited on the catalyst from an acidified (HNO₃) solution of "N" brand sodium silicate, yields of 25.2 per cent of gasoline and 11.1 per cent of gas plus coke were obtained. In order to determine the optimum silica deposit for maximum gasoline yields when reactivating with sodium silicate, a series of runs were made, the data for which are given in the following table:

| Catalyst | Treating Agent | Silica Deposit Wt. Per Cent | Yield Wt. Per Cent | | Gasoline/ Gas+ Coke Ratio |
|---|---|---|---|---|---|
| | | | Gasoline | Gas+ Coke | |
| Fresh Catalyst | | 0 | 30.1 | 13.1 | 2.3 |
| Permanently Deactivated Catalyst | | 0 | 21.4 | 9.7 | 2.1 |
| Reactivated Catalyst | 5% aqueous solution of sodium silicate "N" brand. | 1.1 | 25.5 | 9.9 | 2.6 |
| Do | 15% aqueous solution of sodium silicate "N" brand. | 3.2 | 26.0 | 11.5 | 2.3 |
| Do | 25% aqueous solution of sodium silicate "N" brand. | 5.3 | 25.6 | 9.0 | 2.8 |
| Do | 50% aqueous solution of sodium silicate "N" brand. | 10.7 | 21.8 | 7.6 | 2.9 |

When the above data are plotted in a graph, it can be seen that optimum yields of gasoline are obtained when the silica deposit is maintained between about 1 and 7 per cent, the peak of the curve being at about 3 per cent.

EXAMPLE IV

This example illustrates the improved gasoline to gas plus coke ratios which can be obtained when a permanently deactivated catalyst is impregnated with liquid dimethyl silicones. In this example an impregnating procedure similar to that described in Example I was employed. However, in this case Silicone A which is a dimethyl silanediol condensation product wherein the terminal groups are hydroxyl groups and Silicone B which is a dimethyl silanediol condensation product wherein the terminal groups are methyl groups were employed as the impregnating agents. The data in the following table exemplify the improved gasoline to gas plus coke ratios which can be obtained in accordance with my invention. The test procedure employed was in accordance with that described in Example I.

EXAMPLE V

This example illustrates the reactivation of a permanently deactivated natural catalyst in accordance with my invention. This catalyst was prepared from an acid treated montmorillonite clay by pelleting and calcining. It had been permanently deactivated in use in a cracking operation. In reactivating this catalyst a procedure similar to that described in Example I was used. In this instance, however, the reactivating agent was "Ethyl-Silicate-40" as decribed in Example II. In a single impregnation with "Ethyl-Silicate-40" a silica deposit of 6.8 per cent was obtained. In accordance with the test described in Example I the permanently deactivated natural catalyst gave yields of 21.0 per cent of gasoline and 6.3 per cent of gas plus coke. The reactivated catalyst, however, gave 24.8 per cent of gasoline and 8.1 per cent of gas plus coke.

EXAMPLE VI

This example illustrates the improved yield of gasoline as well as the improved gasoline to gas plus coke ratios which can be obtained when a permanently deactivated catalyst which has been subjected to the usual reactivating treatment at 1000° F. is subjected to further calcining at 1400° F. In this example an impregnating procedure similar to that described in Example I was employed. The impregnating agent here, however, is "Ethyl-Silicate-40" and alcoholic solutions thereof. Following the final calcining step in the reactivation treatment of Example I the catalyst was subjected to further calcining at a temperature of 1400° F. for about 10 hours. The results of the additional

| Catalyst | Treating Agent | Silica Deposit, Wt. Per Cent | Yields, Wt. Per Cent | | Gasoline/ Gas+ Coke Ratio |
|---|---|---|---|---|---|
| | | | Gasoline | Gas+ Coke | |
| Fresh Catalyst | | 0 | 30.1 | 13.1 | 2.3 |
| Permanently Deactivated Catalyst | | 0 | 21.4 | 9.7 | 2.1 |
| Reactivated Catalyst | Silicone A Single impregnation | 8.7 | 26.7 | 9.8 | 2.7 |
| Do | Silicone A Double impregnation | 12.3 | 25.6 | 9.0 | 2.8 |
| Do | Silicone A Triple impregnation | 20.8 | 25.9 | 7.3 | 3.5 |
| Do | Silicone A Quadruple impregnation | 28.9 | 26.9 | 6.0 | 4.5 |
| Do | Silicone B Single impregnation | 12.3 | 25.8 | 8.4 | 3.1 |
| Do | Silicone B Double impregnation | 20.1 | 25.2 | 7.0 | 3.6 |
| Do | Silicone B Triple impregnation | 27.7 | 25.0 | 7.0 | 3.6 | high-temperature calcining are shown by the data in the following table:

| Treating Agent | Silica Deposit | Calcining Temperature, °F. | Gasoline | Gas Plus Coke | Gasoline/Gas + Coke Ratio |
|---|---|---|---|---|---|
| 50% ethyl silicate / 50% methyl alcohol | 11.3 | 1,000 | 28.9 | 12.8 | 2.3 |
| | | 1,400 | 29.3 | 8.8 | 3.3 |
| 75% ethyl silicate / 25% methyl alcohol | 17.3 | 1,000 | 31.7 | 15.2 | 2.1 |
| | | 1,400 | 34.1 | 10.6 | 3.2 |
| Ethyl silicate | 22.7 | 1,000 | 32.9 | 18.8 | 1.8 |
| | | 1,400 | 36.0 | 13.2 | 2.7 |
| Ethyl silicate (double impregnation) | 34.1 | 1,000 | 33.3 | 15.9 | 2.1 |
| | | 1,400 | 32.6 | 8.6 | 3.8 |
| Ethyl silicate (triple impregnation) | 38.8 | 1,000 | 28.0 | 13.0 | 2.2 |
| | | 1,400 | 27.3 | 7.7 | 3.5 |

The data in the above table indicate that when a permanently deactivated catalyst is treated in accordance with the invention, the yield of gasoline is increased and the gasoline to gas plus coke ratio is considerably improved when a final calcining temperature of 1400° F. is employed. It will be noted that even though the yield of gasoline decreased slightly when as much as 35 to 40 per cent silica was deposited on the catalyst, the higher-temperature treatment, nevertheless, increased the gasoline to gas plus coke ratio.

It will be understood that the foregoing examples are merely illustrative of the invention and that advantageous results can be obtained by treating others of the class of silica-alumina catalysts by the procedures described. As an additional specific example of a silica-alumina catalyst there may be mentioned a catalyst prepared by a process comprising vacuum impregnating a dry, commercial silica gel in the form of 3 to 8 mesh particles with a 9 per cent solution of $Al_2O_3$ as aluminum nitrate, separating the impregnated silica gel from excess aluminum nitrate solution, and then hydrolyzing the aluminum nitrate by dipping the impregnated gel into a 5 per cent ammonium hydroxide solution. After allowing 24 hours for completion of the hydrolysis, the wet gel was dried at a low temperature and then calcined at 1000° F. for about 10 hours. The catalyst produced contained only about 0.7 per cent $Al_2O_3$ and was not highly active, yielding only 20.7 per cent gasoline when tested in the above manner. This catalyst was permanently deactivated by heating in a bomb under saturated steam pressure to a temperature of 450° F. in about six hours, releasing the pressure and calcining, to produce a catalyst yielding 16.9 per cent gasoline. This catalyst was satisfactorily reactivated so as to produce 20.9 per cent gasoline, by treating with ethyl silicate substantially as described in Example I to introduce 9.2 per cent $SiO_2$ by analysis.

The catalysts to be reactivated in accordance with the invention can be treated in the form in which they were employed in use such as pellets, granules, beads, powder and the like. I have found, for example, that the silica-alumina catalyst available commercially in the form of beads can be reactivated effectively by the present process.

I have stated previously that the more valuable synthetic silica-alumina catalysts contain a higher proportion of silica than alumina. As a matter of fact most of the commercially available catalysts contain about 12 per cent alumina by weight. While I have found that my process is especially effective when applied to these materials, the process is also effective when applied to synthetic silica-alumina catalysts containing widely differing proportions of alumina. Thus, I have tested permanently deactivated silica-alumina cracking catalysts containing as little as one per cent alumina by weight or even less and up to 75 per cent or more alumina and have found that they can be effectively reactivated by the procedures described above.

The invention includes the use as the impregnating agent of the general class of compounds that are fluid or can be made fluid and that yield silica upon decomposition. Thus, in place of the alkyl silicates employed in the examples, other alkyl silicates such as methyl silicate, polymers of alkyl silicates, tetramethyl orthosilicate, and glycol silicate may be used. In place of those employed in the examples other liquid silicones may be used. The silicones are polymeric organosiloxanes composed of multiples of the structure

where R is a hydrocarbon radical such as an alkyl, aryl, or aralkyl radical, or derived therefrom by substitution of oxygen for a portion of the organic groups; or, briefly, polymeric organosilicon oxides. See: An Introduction to the Chemistry of the Silicones, by E. G. Rochow, John Wiley & Sons, Inc. I prefer to employ the lower alkyl silicones of relatively low viscosity so that the impregnating liquid can enter the pores of the catalyst and thereby contact the entire surface of the catalyst, the surface of the pores as well as the exterior surface.

When reactivating catalysts to optimum activity in accordance with the invention the increased silica content of the catalyst is of major importance in determining the activity of the catalyst. The silica content alone, however, is not a sound basis for estimating improved activity as consideration must also be given to the treating agent employed. As pointed out in connection with Example III, when an alkali metal silicate such as sodium silicate is used as the treating agent optimum catalytic activity is obtained when the reactivated catalyst contains from about 1 to 7 per cent added $SiO_2$ by weight. On the other hand, when an alkyl silicate is used as the treating agent best results are generally obtained when the catalyst contains about the maximum that can be introduced by a single impregnation procedure.

Taking into consideration factors of economy as well as catalytic activity, I prefer to treat with an alkyl silicate so as to introduce from about 8 to 35 per cent and especially about 10 to 25 per cent $SiO_2$. When silicones are used the preferred operations involve the introduction of about the same amount of $SiO_2$ as in the case of the alkyl silicates.

Throughout this specification I have referred to permanently deactivated catalysts. This description has come to be applied to catalysts that have lost any of their initial activity and that cannot be restored to their initial activity by regeneration. The term "spent catalysts" is sometimes used to mean the same thing as "permanently deactivated catalysts," but a spent catalyst is more properly a catalyst that has been permanently deactivated to a stage such that it is no longer usable in commercial operations. The term "permanently deactivated catalysts" properly includes not only spent catalysts but also catalysts that have lost only a part of their initial activity. As previously pointed out, the present reactivation treatment may be employed to maintain the activity of a catalyst. For example, in fixed-bed operations the catalyst may be treated as herein described long before the activity of the catalyst has fallen to a point where replacement of the catalyst is normally indicated.

My invention may be applied to the reactivation of catalysts used in moving bed-type operations as well as fluid-type catalytic cracking processes. However, my invention is particularly advantageous when applied to fixed-bed operations in that the catalyst can be reactivated without removing the catalyst from the cracking chamber.

The catalysts reactivated in accordance with the invention have been described as containing silica deposited on the surface. It will be understood by those skilled in the art that the silicon compound may be present as hydrated silicon dioxide or polymers of such hydrated compounds. There is evidence that the presence of hydroxyl hydrogen atoms in the compounds impregnated on the catalyst is advantageous and therefore it is believed that the more active reactivated catalysts contain at least part of the silica in the hydrated state.

It will be understood that where catalyst surface is referred to herein, the interior or pore surface as well as the exterior surface of the catalyst is intended.

This application is a continuation-in-part of my application Serial No. 650,138, filed February 25, 1946, now abandoned.

Obviously many modifications and variations of the invention, as hereinbefore set forth, may be made without departing from the spirit and scope thereof, and therefore only such limitations should be imposed as are indicated in the appended claims.

I claim:

1. The method of reactivating a permanently deactivated silica-alumina cracking catalyst which consists in impregnating the surface of said catalyst with a fluid compound yielding silica upon decomposition, and decomposing said impregnated compound.

2. The method of reactivating a calcined permanently deactivated silica-alumina cracking catalyst which comprises impregnating the surface of said catalyst with a fluid compound yielding silica upon decomposition, and decomposing said impregnated compound.

3. A method in accordance with claim 2 in which the compound yielding silica upon decomposition is an alkyl silicate.

4. A method in accordance with claim 3 in which the alkyl silicate is ethyl silicate.

5. A method in accordance with claim 2 in which the compound yielding silica upon decomposition is a liquid silicone.

6. A method in accordance with claim 2 in which the compound yielding silica upon decomposition is sodium silicate.

7. The method of reactivating a calcined permanently deactivated synthetic silica-alumina cracking catalyst which is a composite prepared by combining undried alumina hydrogel and silica gel which comprises impregnating the surface of said catalyst with a fluid compound yielding silica upon decomposition, and decomposing said impregnated compound.

8. The method of reactivating a permanently deactivated synthetic silica-alumina cracking catalyst which is a calcined composite prepared from undried silica and alumina hydrogel, which method comprises impregnating the surface of said catalyst with a fluid compound yielding silica upon decomposition, and decomposing said impregnated compound.

9. A method in accordance with claim 8 in which the compound yielding silica upon decomposition is an alkyl silicate.

10. A method in accordance with claim 9 in which the alkyl silicate is ethyl silicate.

11. A method in accordance with claim 8 in which the compound yielding silica upon decomposition is a liquid silicone.

12. A method in accordance with claim 11 in which the silicone is a methyl silicone.

13. A method in accordance with claim 8 in which the compound yielding silica upon decomposition is sodium silicate.

14. The method of reactivating a calcined permanently deactivated synthetic silica-alumina cracking catalyst which is a composite prepared by combining alumina hydrogel and silica gel, which comprises impregnating said permanently deactivated catalyst with an alkyl silicate in an amount equivalent to that necessary to produce a reactivated catalyst containing 10 to 25 per cent by weight added silica, heating said catalyst impregnated with said alkyl silicate to decompose said alkyl silicate and produce a catalyst containing 10 to 25 per cent by weight added silica, and then calcining the resulting silica-containing catalyst at an elevated temperature.

15. The method of reactivating a permanently deactivated synthetic silica-alumina cracking catalyst which is a calcined composite prepared from undried silica and alumina hydrogel, which comprises impregnating said permanently deactivated catalyst with ethyl silicate in an amount equivalent to that necessary to produce a reactivated catalyst containing 10 to 25 per cent by weight added silica, heating said catalyst impregnated with said ethyl silicate to decompose said ethyl silicate and produce a catalyst containing 10 to 25 per cent by weight added silica, and then calcining the resulting silica-containing catalyst at an elevated temperature.

16. The method of reactivating a calcined permanently deactivated synthetic silica-alumina cracking catalyst which is a composite prepared by combining alumina hydrogel and silica gel, which comprises impregnating said permanently deactivated catalyst with sodium silicate in an amount equivalent to that necessary to produce a reactivated catalyst containing 1 to 7 per cent by weight added silica, decomposing said impregnated sodium silicate to produce a catalyst containing 1 to 7 per cent by weight added silica, and then calcining the resulting silica-containing catalyst at an elevated temperature.

17. The method of reactivating a calcined permanently deactivated synthetic silica-alumina cracking catalyst which is a composite prepared by combining alumina hydrogel and silica gel, which comprises impregnating the surface of said catalyst with a fluid compound yielding silica upon decomposition, decomposing said impregnated compound, and then heating the resulting silica-impregnated catalyst at 1200° to 1500° F.

18. The method of reactivating a calcined permanently deactivated synthetic silica-alumina cracking catalyst which is a composite prepared by combining alumina hydrogel and silica gel, which comprises impregnating said permanently deactivated catalyst with an alkyl silicate in an amount equivalent to that necessary to produce a reactivated catalyst containing 10 to 25 per cent by weight added silica, heating said catalyst impregnated with said alkyl silicate to decompose said alkyl silicate and produce a catalyst containing 10 to 25 per cent by weight added silica, calcining the resulting silica-containing catalyst, and maintaining said catalyst at a temperature of 1200° to 1500° F. to adjust the activity of said catalyst.

WILLIAM A. PARDEE.

REFERENCES CITED

The following references are of record in the file of this patent:

UNITED STATES PATENTS

| Number | Name | Date |
|---|---|---|
| 2,330,174 | Hachmuth | Sept. 21, 1943 |
| 2,346,844 | Hull | Apr. 18, 1944 |
| 2,428,741 | Plank | Oct. 7, 1947 |
| 2,439,852 | Jackson | Apr. 20, 1948 |
| 2,480,627 | Bodkin et al. | Aug. 30, 1949 |

FOREIGN PATENTS

| Number | Country | Date |
|---|---|---|
| 344,499 | Germany | Mar. 13, 1920 |